Sept. 6, 1966  B. S. OLSSON  3,270,575
DEVICES FOR PERFORMING ROTATIONAL MOVEMENTS
Filed Nov. 9, 1962
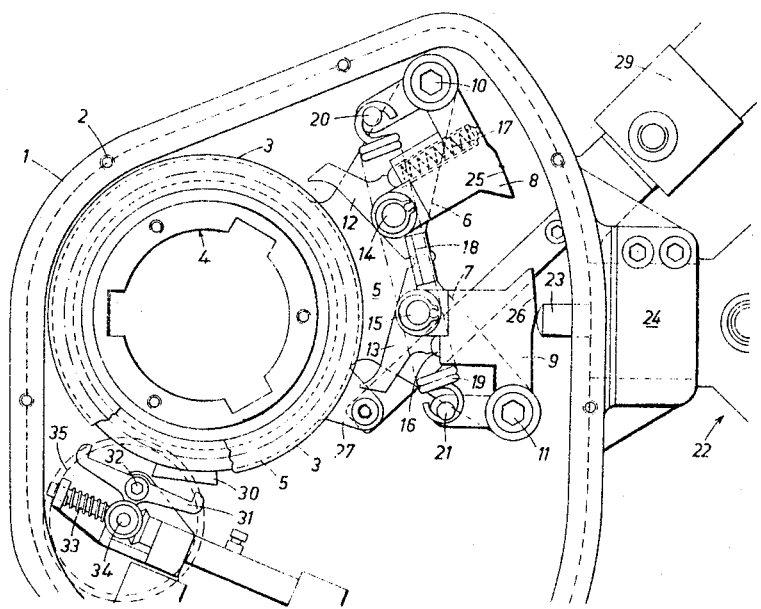

3,270,575
DEVICES FOR PERFORMING ROTATIONAL MOVEMENTS
Bror Sigurd Olsson, Mariestadsvagen 22,
Johanneshov, Sweden
Filed Nov. 9, 1962, Ser. No. 236,576
Claims priority, application Sweden Nov. 14, 1961,
9,575/61; Oct. 29, 1962, 11,596/62
5 Claims. (Cl. 74—142)

The present invention relates to a device for creating stepwise rotational movements of a working member, f.i. a turnable valve stem for opening and closing the valve. More especially the invention relates to such devices furnished with pawls adapted for driving a toothed or ratchet wheel operatively connected with said working member in either direction of rotation when actuated by a reciprocating means such as a piston rod of a pressure fluid actuated servomotor.

In known devices for selectively performing opposite rotational movements such as for opening or closing valves a separate servomotor acts on one pawl for turning the toothed wheel in one direction and another separate servomotor acts on another pawl for driving the toothed wheel in the opposite direction, which makes the whole plant bulky and expensive.

Therefore a main object of the invention is to provide a device having one single servomotor for driving the toothed wheel both in clockwise and counter-clockwise direction of rotation.

In most applications for such a device the torque to be overcome at the start from standstill is greater than that to be overcome during the almost continuous stepwise feeding motion. This is especially pronounced in valves where the torque required for closing a valve is insufficient for opening the same. Regard should also be paid to alternating valves and to the fact that most valves with rising stem now-a-days are manufactured with a vertically acting sealing member for the valve stem and in this case the starting torque in both directions of rotation is elevated with respect to the required drawings-home torques.

Thus another object of the invention is to provide a device by means of which the pawls are subjected to an elevated starting torque by a constant force acting on the pawls by the servomotor while the subsequent feeding movements are carried out with a normal torque under the influence of the same constant force.

Still another object of the invention is to provide a device in which said different actuations can be carried out with one single servomotor performing a constant stroke of its actuation member, such as a piston rod.

For realizing said objects a device according to the invention is provided with a unit comprising two pawls adjustable relative to a reciprocating actuation member in such a direction substantially transverse to the working direction of the pawls that for selection of the direction of rotation the reciprocating actuating member can act on one or the other of said pawls for selecting the direction of rotation and in a selectable point thereon for adjusting the length of the feeding movement of each step.

The foregoing objects of the invention and other objects will become apparent as the description proceeds with reference to the embodiment shown on the annexed drawing. The drawing shows a partially broken plan view of a device for performing reversible rotational movements according to the invention.

In the single view, the embodiment shown for performing a rotational movement comprises a casing 1 which may be closed by a cover (not shown) secured to 1 by means of screws engaging threaded holes 2. In said casing 1 a toothed or ratchet wheel 3 is rotatably mounted and provided with a central hole 4 adapted to unturnably engage a spindle to be turned in one direction or the other. Between said toothed wheel 3 and the bottom of the casing 1 a ring shaped member 5 is rotatably mounted. Said ring shaped member 5 is provided with two arm 6 and 7 extending in a radial plane with respect to the axis of the toothed wheel 3 and in opposite directions. Each arm 6 and 7 supports a bell crank 8 and 9 respectively turnable about a pivot 10 and 11 respectively parallel to the axis of rotation of the toothed wheel 3. Each bell crank 8 and 9 supports in turn a pawl 12, 13 swingable about its stud shaft 14, 15 on said bell crank 8 and 9 respectively. The pawls 12 and 13 are each resiliently urged in a direction towards the toothed wheel 3 by a compression spring 16 and 17 respectively; the spring 17 being shown in more detail by dotted lines. A stop member 18 is provided on the arms 6, 7 at their junction and forms a support for the rear ends of the pawls 12, 13.

A draw spring 19 is anchored with its ends to studs 20, 21 on said bell cranks 8, 9 to hold the pawls 12, 13 in the position shown in the figure out of engagement with the toothed wheel 3.

A driving mechanism 22 having a reciprocating rod 23 is mounted in a bracket 24 on the casing 1 so that the end of the reciprocating rod 23 extends into the inner of said casing 1 in a plane through elongated engagement surfaces 25 and 26 of said bell cranks 8 and 9.

The ring shaped supporting member 5 is provided with a lug 27 hinged to the piston rod of a control piston and cylinder device 29 adapted to adjust the position of said ring shaped member 5 with its arms 6, 7 and pawl mechanisms relative to said reciprocating rod 23.

The ring shaped member 5 is further provided with a stop head 30 at its circumference. A lever 31 turnable about a pivot 32 between its ends is adapted to engage said head 30 with one or the other of its hook-shaped ends. Spring means 33 is adapted to normally hold the lever 31 in an inactive position. A shaft 34 supporting a toothed wheel 35 meshing with the above mentioned toothed wheel 3 is operatively connected with said lever 31 to swing the same in one or the other direction dependent on the direction of movement of said first toothed wheel 3.

It should be noticed that the elongated engagement surfaces 25, 26 of the bell cranks 8 and 9 respectively of the pawl mechanisms are located substantially radially with respect to the axis of the pivot 10 and 11 so that the reciprocating rod 23 may come into contact with the respective bell crank 8 or 9 at different distances from the pivot axis of the latter and thereby exerting different torques on the bell crank and consequently different operating forces on the respective pawl. Moreover it is possible to select a certain length of movement of the pawl 12 or 13 by the relative position of the bell crank 8 or 9 and the reciprocating rod 23. Thus a various length of the feeding movement of the pawl 12 or 13 can be obtained in spite of the fact that said reciprocating rod 23 performs a constant stroke. This condition is of great advantage as the servomotor can be constructed in a simple manner having a predetermined stroke.

The device acts as follows. When starting the reciprocating servomotor 22 the control device 29 is simultaneously actuated and moves the ring shaped member 5 in a predetermined direction. The hooked lever 31 is swung by the meshing toothed wheels 3 and 35 to take up a predetermined arresting position for the stop head 30 on the ring shaped member 5 dependent on the direction of rotation of the toothed wheel 3.

As the ring shaped member 5 is moved to this position the pawl mechanism is moved relative to the reciprocating rod 23 to such a point on the elongated engagement surfaces 25 or 26 of one of the pawl mechanisms far away from its pivot resulting in the shortest feeding movement of the pawl. Suitably the pawl mechanism is arranged to perform a feeding movement corresponding to the distance between two teeth of the toothed wheel 3. After a couple of working strokes the control piston and cylinder device 29 moves the ring shaped member 5 to a position in which the reciprocating rod 23 makes contact with the elongated surface 25 or 26 of the pawl mechanism at a point nearer the pivot axis of the pawl mechanisms thereby lengthening the stroke of the pawl preferably to a length corresponding to the spacing of three teeth.

At this operation the hooked lever 31 is automatically brought to take up a position permitting said adjustment movement of the ring shaped member 5.

I claim:

1. A device for imparting to a rotatable member stepwise rotational movements between two definite end positions and for providing an increased initial torque, said device including a gear wheel operable for actuating said rotatable member, two pawl means, one for driving said gear wheel in a clockwise direction of rotation and the other for driving the same in a counter-clockwise direction of rotation, an actuating member operative for imparting different directions of rotation to said gear wheel by actuating either of said pawl means, support means mounting said pawl means tiltably about a journal point each, said support means being journalled concentrically to said gear wheel and being rotatable in opposite directions about the same axis as the latter, each of said pawl means being actuatable by said actuating member at different distances from their journal points thereby providing different torques and different velocities for said rotatable member.

2. A device for imparting to a rotatable member stepwise rotational movements between two definite end positions and for providing an increased initial torque, said device including a gear wheel operable for actuating said rotatable member, two pawl means, one for driving said gear wheel in a clockwise direction of rotation and the other for driving the same in a counter-clockwise direction of rotation, a reciprocating actuating member operative for imparting different directions of rotation to said gear wheel by actuating either of said pawl means, support means mounting said pawl means tiltably about a journal point each, said support means being journalled concentrically to said gear wheel and being rotatable in opposite directions about the same axis as the latter, each of said pawl means being actuatable by said actuating member at different distances from their journal points thereby providing different torques and different velocities for said rotatable member.

3. A device for imparting to a rotatable member stepwise rotational movements between two definite end positions and for providing an increased initial torque, said device including a gear wheel operable for actuating said rotatable member, two pawl means, one for driving said gear wheel in a clockwise direction of rotation and the other for driving the same in a counter-clockwise direction of rotation, an actuating member operative for imparting different directions of rotation to said gear wheel by actuating either of said pawl means, support means mounting said pawl means tiltably about a journal point each, said support means being journalled concentrically to said gear wheel and being rotatable in opposite directions about the same axis as the latter, each of said pawl means being adjustable to a preselected point of engagement with respect to its journal point for selecting the direction of operation and the length of the operation stroke of the pawl means, respectively, and means operable for adjusting the position of said support means to provide automatically the shortest stroke of the pawl means and the greatest force at the initiating of the rotational movement of the rotatable member.

4. A device for imparting to a rotatable member stepwise rotational movements between two definite end positions and for providing an increased initial torque, said device including a gear wheel operable for actuating said rotatable member, two pawl means, one for driving said gear wheel in a clockwise direction of rotation and the other for driving the same in a counter-clockwise direction of rotation, an actuating member operative for imparting different directions of rotation to said gear wheel by actuating either of said pawl means, support means mounting said pawl means tiltably about a journal point each, said support means being journalled concentrically to said gear wheel and being rotatable in opposite directions about the same axis as the latter, each of said pawl means being adjustable to a preselected point of engagement with respect to its journal point for selecting the direction of operation and the length of the operation stroke of the pawl means, respectively, and means operable for adjusting the position of said support means to provide automatically the longest stroke of the pawl means and the smallest force in post-initial rotational movement of the rotatable member.

5. A device for imparting to a rotatable member stepwise rotational movements between two definite end positions and for providing an increased initial torque, said device including a gear wheel operable for actuating said rotatable member, two pawl means, one for driving said gear wheel in a clockwise direction of rotation and the other for driving the same in a counter-clockwise direction of rotation, an actuating member operative for imparting different directions of rotation to said gear wheel by actuating either of said pawl means, support means mounting said pawl means tiltably about a journal point each, said support means being journalled concentrically to said gear wheel and being rotatable in opposite directions about the same axis as the latter, each of said pawl means being adjustable to a preselected point of engagement with respect to its journal point for selecting the direction of operation and the length of the operation stroke of the pawl means, respectively, adjustable means operable for arresting said support means in a preselected point of engagement between said actuating member and the respective pawl means with relation to the journal point of said pawl means thereby defining the length of the operating stroke of the pawl means at the initiation of the rotational movement of the rotatable member, and restoring means for said arresting means operative for restoring said arresting means to inoperative position after a predetermined number of strokes of the respective pawl means.

References Cited by the Examiner

UNITED STATES PATENTS

| | | | |
|---|---|---|---|
| 2,558,953 | 7/1951 | Henninger et al. | 74—142 |
| 2,758,569 | 8/1956 | Peterson | 91—342 |
| 2,864,260 | 12/1958 | Nicolaus | 74—142 |
| 2,993,383 | 7/1961 | Ardner | 74—142 |
| 3,020,774 | 2/1962 | Kullmann | 74—142 |
| 3,021,823 | 2/1962 | Dinkelkamp | 91—342 |
| 3,078,732 | 2/1963 | Schaeht | 74—142 X |

MILTON KAUFMAN, *Primary Examiner.*

SAMUEL LEVINE, *Examiner.*

BROUGHTON DURHAM, J. LABOWSKY, D. P. ROONEY, J. A. MARSHALL, *Assistant Examiners.*